US012118218B2

(12) United States Patent
Li (10) Patent No.: US 12,118,218 B2
(45) Date of Patent: Oct. 15, 2024

(54) METHOD AND APPARATUS FOR PROCESSING ABNORMAL POWER FAILURE OF SOLID STATE DISK, AND ELECTRONIC DEVICE AND MEDIUM (71) Applicant: SUZHOU METABRAIN INTELLIGENT TECHNOLOGY CO., LTD., Jiangsu (CN)

(72) Inventor: Zifeng Li, Jiangsu (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/686,583

(22) PCT Filed: Aug. 31, 2022

(86) PCT No.: PCT/CN2022/116338
§ 371 (c)(1),
(2) Date: Feb. 26, 2024

(87) PCT Pub. No.: WO2023/098192
PCT Pub. Date: Jun. 8, 2023

(65) Prior Publication Data
US 2024/0264751 A1 Aug. 8, 2024

(30) Foreign Application Priority Data
Nov. 30, 2021 (CN) .......................... 202111442693.6

(51) Int. Cl.
G06F 3/06 (2006.01)
G06F 1/30 (2006.01)

(52) U.S. Cl.
CPC .............. *G06F 3/0619* (2013.01); *G06F 1/30* (2013.01); *G06F 3/0647* (2013.01); *G06F 3/0656* (2013.01); *G06F 3/0679* (2013.01)

(58) Field of Classification Search
CPC .... G06F 3/0619; G06F 3/0647; G06F 3/0656; G06F 3/0679; G06F 3/0659;
(Continued)

(56) References Cited

U.S. PATENT DOCUMENTS

2013/0219107 A1* 8/2013 Lee ...................... G11C 11/5628
711/E12.008
2015/0194220 A1* 7/2015 Yang .................. G11C 16/3436
365/185.12
(Continued)

FOREIGN PATENT DOCUMENTS

| CN | 103150125 A | 6/2013 |
|---|---|---|
| CN | 105094685 A | 11/2015 |

(Continued)

Primary Examiner — Curtis James Kortman
(74) Attorney, Agent, or Firm — IPro, PLLC (57) ABSTRACT Provided are a method and apparatus for processing abnormal power failure of a solid state disk, and an electronic device and a computer-readable storage medium. The method includes: in response to detecting an abnormal power failure of a solid state disk, acquiring a write operation for the solid state disk; in response to the write operation being a cold data write operation, acquiring a write address corresponding to the write operation, and discarding the cold data write operation, wherein the write address points to a cold data block; obtaining the minimum write address of the cold data block by using the write address; and generating, by using the minimum write address, data block information corresponding to the cold data block.

19 Claims, 2 Drawing Sheets (58) Field of Classification Search
CPC ........ G06F 3/0652; G06F 3/06; G06F 3/0631; G06F 1/30; G06F 1/28; G06F 12/0246; G06F 12/0253; G06F 12/02; G06F 12/0238; G06F 12/10; G06F 2212/1032; G06F 2212/7201; G06F 2212/7205; G06F 2212/7207; G06F 11/1441; G06F 11/0793; G06F 13/1668
See application file for complete search history.

(56) References Cited

U.S. PATENT DOCUMENTS

| | | | |
|---|---|---|---|
| 2017/0277608 A1 | 9/2017 | Shi et al. | |
| 2019/0220392 A1* | 7/2019 | Lin | G11C 5/143 |
| 2019/0335062 A1 | 10/2019 | Sou et al. | |
| 2020/0348880 A1* | 11/2020 | Eliash | G06F 3/0619 |
| 2023/0038857 A1* | 2/2023 | Tomlin | G06F 12/0882 |
| 2023/0289067 A1* | 9/2023 | Kantani | G11C 11/5628 |

FOREIGN PATENT DOCUMENTS

| | | | |
|---|---|---|---|
| CN | 105808156 A | | 7/2016 |
| CN | 107329696 A | | 11/2017 |
| CN | 108052289 A | * | 5/2018 |
| CN | 108710583 A | | 10/2018 |
| CN | 111475114 A | | 7/2020 |
| CN | 112433959 A | * | 3/2021 |
| CN | 114328281 A | | 4/2022 |

* cited by examiner

METHOD AND APPARATUS FOR PROCESSING ABNORMAL POWER FAILURE OF SOLID STATE DISK, AND ELECTRONIC DEVICE AND MEDIUM

CROSS-REFERENCE TO RELATED APPLICATION

The present disclosure claims priority to Chinese patent application No. 202111442693.6 entitled "METHOD AND APPARATUS FOR PROCESSING ABNORMAL POWER FAILURE OF SOLID STATE DISK, AND ELECTRONIC DEVICE AND MEDIUM", filed on Nov. 30, 2021 before the China National Intellectual Property Administration, the entire contents of which are incorporated herein by reference.

TECHNICAL FIELD

The present disclosure relates to the technical field of solid state disks, and in particular to an method for processing an abnormal power failure of a solid state disk, an apparatus for processing an abnormal power failure of a solid state disk, an electronic device and a non-transitory computer readable storage medium.

BACKGROUND

A solid state disk (Solid State Disk or Solid State Drive, SSD for short) is a hard disk made from an array of solid state electronic memory chips. For an SSD with capacitors, an abnormal power failure may occur during the operation thereof. After the abnormal power failure occurred, the SSD may operate for a short period with power in the capacitors to complete the writing of unwritten data. However, inventors have realized that the period during which the capacitor can supply power is very short, while the SSD may have a large quantity of unwritten data that would take a long period. As a result, the data may not be completely written into the SSD, resulting in a loss of part of the data that is sent to the SSD from the host for storage.

SUMMARY

An aspect of the present disclosure provides a method for processing an abnormal power failure of a solid state disk, including:
  acquiring a write operation for a solid state disk in response to detecting an abnormal power failure of the solid state disk;
  in response to the write operation being a cold data write operation, acquiring a write address corresponding to the cold data write operation, and discarding the cold data write operation, the write address pointing to a cold data block;
  obtaining a minimum write address of the cold data block by using the write address; and
  generating data block information corresponding to the cold data block by using the minimum write address.
  In an embodiment, the obtaining a minimum write address of the cold data block by using the write address includes:
    comparing the write address with a current minimum address of the cold data block;
    determining the write address as a new current minimum address in response to the write address being less than the current minimum address; and
    determining the current minimum address as the minimum write address in response to an absence of a pending write operation.
  In an embodiment, before comparing the write address with the current minimum address of the cold data block, the method further includes:
    deciding whether the current minimum address exists;
    in response to deciding that no current minimum address exists, determining the write address as a new current minimum address; and
    in response to deciding that the current minimum address exists, determining to perform the step of comparing the write address with the current minimum address of the cold data block.
  In an embodiment, the comparing the write address with a current minimum address of the cold data block includes:
    determining the cold data block corresponding to the write address by using data block boundary information;
    acquiring the current minimum address corresponding to the cold data block, and comparing the current minimum address with the write address.
  In an embodiment, in response to the write operation being a cold data write operation includes:
    acquiring a data type mark in the write operation; and
    in response to the data type mark indicating a cold data state, determining the write operation as the cold data write operation.
  In an embodiment, the discarding the cold data write operation includes:
    releasing a write buffer, a context resource and a work flow corresponding to the cold data write operation.
  In an embodiment, the detecting an abnormal power failure of a solid state disk includes:
    in response to the solid state disk being powred down without receiving a power failure notification sent from a host, determining that the abnormal power failure of the solid state disk is detected: or
    counting a notification duration in response to receiving a power failure notification sent from a host of the solid state disk; and in response to the solid state disk being powered down within a notification duration less than a preset duration, determining that the abnormal power failure of the solid state disk is detected.
  The present disclosure also provides an apparatus for processing an abnormal power failure of a solid state disk, including:
    an acquisition module configured for acquiring a write operation for the solid state disk in response to detecting that an abnormal power failure of the solid state disk;
    a discarding module configured for, in response to the write operation being a cold data write operation, acquiring a write address corresponding to the cold data write operation and discarding the cold data write operation, wherein the write address points to a cold data block;
    a minimum address determination module configured for obtaining a minimum write address of the cold data block by using the write address; and
    an information generation module configured for generating data block information corresponding to the cold data block by using the minimum write address.
  The present disclosure also provides an electronic device, including a memory and one or more processors, the memory is configured for storing computer readable instructions; and the one or more processors is configured for executing the computer readable instructions to implement the method for processing the abnormal power failure of the solid state disk described above.

The present disclosure also provides a non-transitory computer readable storage media storing computer readable instructions that, when executed by one or more processors, cause the one or more processors to perform the method for processing the abnormal power failure of the solid state disk described above.

BRIEF DESCRIPTION OF THE DRAWINGS

In order to more clearly describe the technical solutions in the embodiments of the disclosure or the related art, the drawings to be used in the illustration of the embodiments or the related art will be briefly introduced below. It will be apparent to those skilled in the art that the drawings in the following description only illustrate embodiments of the disclosure, and based on these drawings, other drawings may be obtained by those skilled in the art without paying any creative works.

DETAILED DESCRIPTION OF THE EMBODIMENTS

In order to make objects, solutions and advantages of the embodiments of the disclosure more clear, the solutions of the embodiments of the present disclosure will be clearly and throughly described below with reference to accompanying drawings of the embodiments. Apparently, the embodiments described are merely some embodiments of the disclosure, rather than all the embodiments. All other embodiments obtained, based on these embodiments, by those skilled in the art without paying any creative works fall within the scope of the present disclosure.

Figure 1:
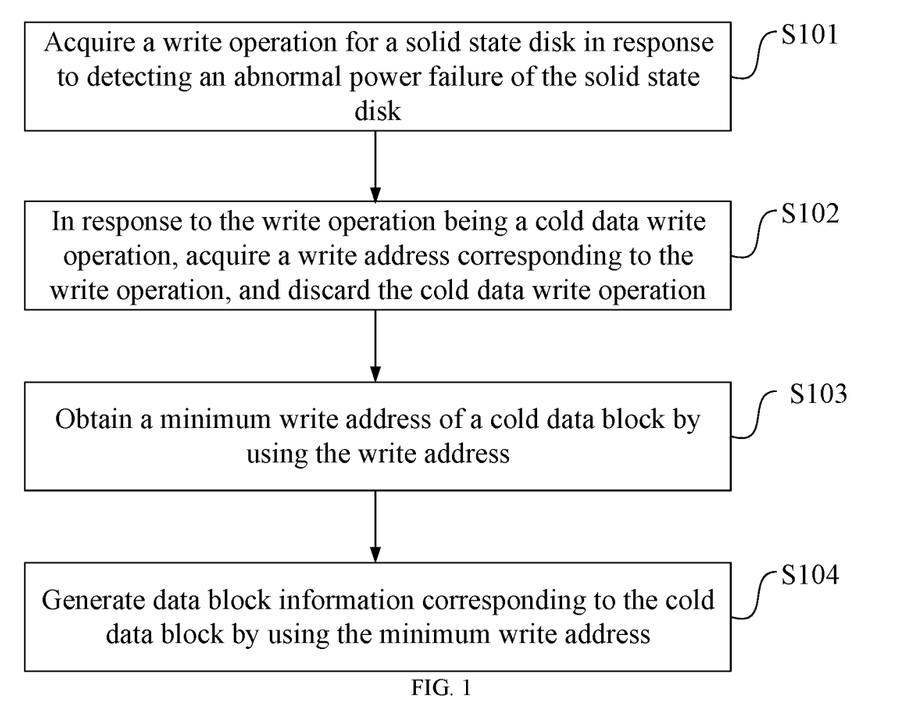
FIG. 1 is a flow chart of a method for processing an abnormal power failure of a solid state disk provided in one or more embodiments of the present disclosure.

Reference is made to FIG. 1, which is a flow chart of a method for processing an abnormal power failure of a solid state disk provided in an embodiment of the present disclosure. The method includes steps described below.

At S101, if an abnormal power failure of a solid state disk is detected, a write operation for the solid state disk is acquired.

It should be noted that various steps in the present disclosure may be performed by a controller in a solid state disk (i.e., an SSD), in particular a write manager (WM). The controller may be responsible for encapsulating a write operation (for example, allocating resources required for the running of the write operation), and responsible for scheduling the write operation (for example, issuing the write operation for execution), etc.

A normal power failure means that in response to receiving a power failure notification issued by the host, the SSD is powered down after having performed all operations. An abnormal power failure is a power failure that does not comply with a process of the normal power failure. In an embodiment, it may be determined that a abnormal power failure of the solid state disk is detected if the SSD is powered down without receiving a power failure notification sent from the host. The controller may monitor the power supply condition of the SSD. Assuming that a power supply interruption is detected, for example, a power supply voltage becomes 0, then the controller may determine the occurrence of the power failure, and if no power failure notification sent from the host is acquired before the SSD is powered down, the controller may determine that an abnormal power failure occurs. In another embodiment, if the solid state disk is powered down after receiving the power failure notification within a notification duration less than a preset duration, it is determined that the abnormal power failure of the solid state disk is detected. That is, after the power failure notification is received, the notification duration is counted, and if the SSD is powered down within a notification duration less than the preset duration, it can be determined that the abnormal power failure is detected.

Figure 2:
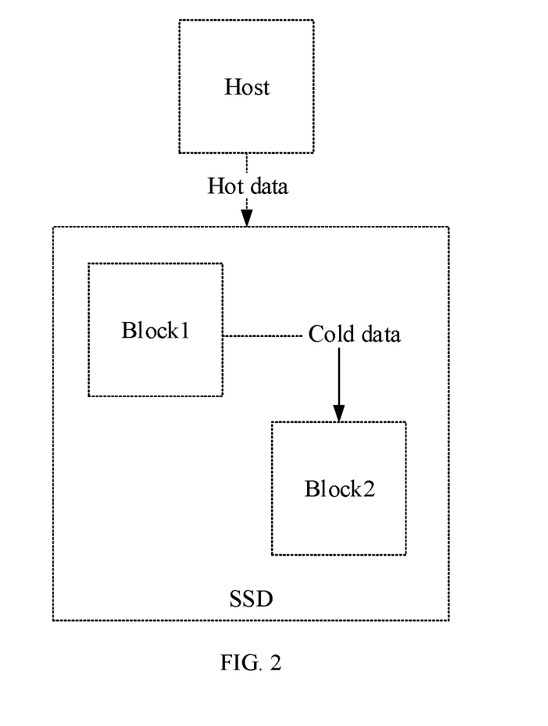
FIG. 2 is a diagram illustrating a flow of write operation data provided in one or more embodiments of the present disclosure.

In order to avoid data loss after the abnormal power failure is detected, the present disclosure provides a special power failure processing method for rationally processing the write operation to the SSD and writing data having not been written into the SSD as quickly as possible. Reference is made to FIG. 2, which is a diagram illustrating a flow of write operation data provided in an embodiment of the present disclosure. In the actual operation, a write operation corresponding to the SSD involves two types of optional write operation data. The first type of write operation data is hot data, that is, data that is issued by the host to be written into the SSD, which is usually user data issued by a user via the host. The second type of write operation data is cold data, that is actually data that has been stored in the SSD, and a write operation corresponding to the cold data is used for migrating the same from a storage location to another storage location, for example, migrating the data from Block1 (that is, a first data block) to Block2 (that is, a second data block). The migration of the cold data is imperceptible to the host, and is a spontaneous writing action in the SSD background. It will be appreciated that the cold data has already been written into the SSD, thus no data will be lost even if the write operation corresponding to the cold data is not performed. However, if the write operation corresponding to the hot data is not performed in time, in other words, the write operation corresponding to the hot data is not performed within the power supply duration of the capacitor, the data will be lost.

Therefore, after the abnormal power failure of the SSD is detected, the write operation for the SSD needs to be acquired and executed as soon as possible. In the execution, the specific type of the write operation needs to be determined, so as to determine whether data loss will occur if the currently acquired write operation is not executed. It should be noted that a specific acquisition manner of the write operation is not limited in the present embodiment. In an implementation manner, the write operation may be acquired from a queue of write operations, and may be encapsulated and generated locally. For example, for the write operation corresponding to the cold data, a specific encapsulation process may include: allocating a context resource to the cold data; allocating a physical block address (PBA), that is, a write address, to the cold data; allocating an available write buffer, and in response to a shortage of write buffers, waiting for buffers occupied by other write operations to be released; allocating an available flow ID (i.e. work flow identification), and in response to no available flow ID being presented, waiting for a release. After the above process is completed, a write operation to a NAND (NAND flash memory, i.e., flash memory device) can be initiated.

At S102, if the write operation is a cold data write operation, a write address corresponding to the write operation is acquired, and the cold data write operation is discarded.

The write address points to a cold data block which refers to a data block dedicated to storing the cold data.

If the write operation is a cold data write operation, i.e., the data to be written is cold data, it means that data loss will not occur even if the write operation is not performed. In this case, the write address corresponding to the write operation can be acquired so as to subsequently generate data block information about the cold data block pointed to by the write address, and then the cold data write operation is discarded, that is, the cold data write operation is ignored so as to re-acquire a new write operation.

A specific mode of the cold data write operation is not limited in the embodiment. For example, in an implementation manner, a write data source of the write operation can be detected, and the write operation can be determined as the cold data write operation in response to detecting that the write data source is SSD; in another implementation, a data type mark in the write operation can be acquired, and the data type mark refers to a mark used for recording a write data type. The data type mark can indicate whether the write data is hot data or cold data, for example, hot data may be identified by a data type mark of 1, and cold data may be identified by a data type mark of 0. If the data type mark is in a cold data state, i.e., represents the cold data, then the write operation may be determined as the cold data write operation.

The manner of discarding the cold data write operation is not limited in the embodiment either. For example, in an implementation manner, since the generation of the cold data write operation occupies a certain resource, for example a memory resource, the cold data may be discarded by releasing the resource. The write buffer, the context resource and the work flow corresponding to the cold data write operation are released.

At S103, a minimum write address of the cold data block is obtained by using the write address.

At S104, data block information corresponding to the cold data block is generated by using the minimum write address.

A write address needs to be allocated to the cold data when the cold data write operation is generated, and a pointer pointing to the write address needs to be shifted backward after the allocation of the write address is completed, so as to subsequently allocate a write address for new cold data. However, in step S102, the cold data write operation is discarded, in other words, the cold data is not actually migrated to the write address, so there is no data in the write address in the cold data block and new data can be written in subsequently. Since the pointer pointing to the write address is shifted, a blank space that cannot be used will appear in the cold data block if no processing is done, resulting in a waste of storage space. For example, if the write address allocated when the cold data write operation is generated is address 1, the pointer is shifted backward to address 2 after the allocation is completed, where address 2 is greater than address 1. A space from address 1 to address 2 is not written with cold data and is still blank. In this case, the pointer will point to address 2 if no processing is done, thus data will be written since address 2 when the SSD is operated again. As a result, the space between address 1 and address 2 cannot be used and becomes a blank space.

In order to solve the problem mentioned above, in the present disclosure, a minimum value of all the write addresses (one or more), namely, a minimum write address, is determined, and the minimum write address is used to generate the data block information corresponding to the cold data block. When the SSD starts to operate again, a position of the pointer may be reset using the data block information, so that the pointer points to an earliest blank position in the cold data block. For example, if a total of two cold data write operations are discarded, the two cold data write operations corresponding to address 1 and address 2 respectively, and address 1 being less than address 2, then address 1 is determined as the minimum write address, and is written with data block information. It can be understood that, when the write addresses are allocated to the cold data write operations, the pointer is shifted backward in sequence. Therefore, after the occurrence of the abnormal power failure of the solid state disk, the write addresses corresponding to a plurality of discarded cold data write operations are consecutive among one another.

A specific manner of obtaining the minimum write address is not limited in the present embodiment. In an implementation manner, a process, in which the minimum write address of the cold data block is obtained using the write address, may include steps below.

At step 11, the write address is compared with a current minimum address of the cold data block.

At step 12, if the write address is less than the current minimum address, the write address is determined as the new current minimum address.

At step 13, if there is no pending write operation, the current minimum address is determined as the minimum write address.

In particular, there may be a plurality of cold data blocks, and the minimum write address corresponding to each cold data block is different. After the write address is obtained, it can be compared with the current minimum address of the cold data block to which it belongs. The current minimum address refers to the minimum write address in the cold data write operations that correspond to the cold data block and are currently discarded. Therefore, when the write address is less than the current minimum address, the write address may be determined as the new current minimum address. This process is repeated. If all the pending write operations have been processed, it is indicated that the current minimum address is the minimum write address among all the discarded cold data write operations corresponding to the cold data block, and thus it is determined as the minimum write address of the corresponding cold data block.

Further, if the cold data write operation is the first discarded write operation corresponding to a certain cold data block, in other words, no current minimum address corresponding to the cold data block exists currently, then the write address may be taken as a new current minimum address. Before comparing the write address with the current minimum address of the cold data block, steps described below may also be performed.

At step 21, it is determined whether the current minimum address exists.

At step 22, if no current minimum address exists, the write address is determined as the new current minimum address.

At step 23, if the current minimum address exists, the method proceeds to the step of comparing the write address with the current minimum address of the cold data block.

If there is a current minimum address, the comparison can be made with the remaining write addresses. If there is no current minimum address, a current minimum address may be created, that is, the write address is determined as the current minimum address.

Furthermore, there may be a plurality of cold data blocks, that is, the cold data write operations discarded after the abnormal power failure refer to at least two data blocks. Accordingly, when the write address is compared with the current minimum address, it is first necessary to determine a cold data block corresponding to the cold data write operation. Specifically, the process in which the write address is compared with the current minimum address of the cold data block may include steps described below.

At step 31, a cold data block corresponding to the write address is determined by using data block boundary information.

At step 32, the current minimum address corresponding to the cold data block is acquired, and the current minimum address is compared with the write address.

The data block boundary information refers to information indicating a boundary position between data blocks. Based on the data block boundary information and the write address, an address range where the write address is located can be determined, and then the cold data block corresponding to the write address is determined, and the current minimum address corresponding to the cold data block is acquired.

It will be appreciated that the process of steps 21 to 23 described above may be combined with the process of steps 31 to 32.

According to the method for processing an abnormal power failure of a solid state disk provided in the embodiment of the present disclosure, if an abnormal power failure of a solid state disk is detected, a write operation for the solid state disk is acquired; if the write operation is a cold data write operation, a write address corresponding to the write operation is acquired, and the cold data write operation is discarded; where the write address points to the cold data block; the write address is used to obtain the minimum write address of the cold data block; the minimum write address is used to generate the data block information corresponding to the cold data block.

As can be seen, in response to detecting an abnormal power failure of the solid state disk, the write operation is acquired and the type of the write operation is detected. If the write operation is a cold data write operation, it means that the write operation is used to migrate the data that has been stored in the the solid state disk to another location. Since the cold data has been stored, there will be no data loss even if the cold data is not migrated. Therefore, after the write address of the cold data write operation is obtained, the cold data write operation is discarded and not executed. The write address points to the cold data block, that is a data block dedicated to storing migrated cold data. Since the cold data write operation has not been executed, the cold data has not been migrated to the blank space pointed to by the write address of the cold data block, so that the write address in the cold data block can continue to be used to store data in the future. The write address needs to be used to obtain the minimum write address in the cold data block. The minimum write address can represent the minimum address pointed to by the discarded cold data write operation, and can represent the start of the unused blank space in the cold data block. The minimum write address is used to generate data block information so that the blank space can be determined later based on the data block information. By discarding cold data write operations, the number of write operations required to be performed is reduced, and all resources are used to write the data sent by the host, avoiding data loss, reducing the time required for data writing, and improving the reliability of the solid state disk.

Hereinafter, an apparatus for processing an abnormal power failure of a solid state disk provided in an embodiment of the present disclosure is described, and reference can be made to the apparatus for processing an abnormal power failure of a solid state disk described below and the method for processing an abnormal power failure of a solid state disk described above reciprocally.

Figure 3:
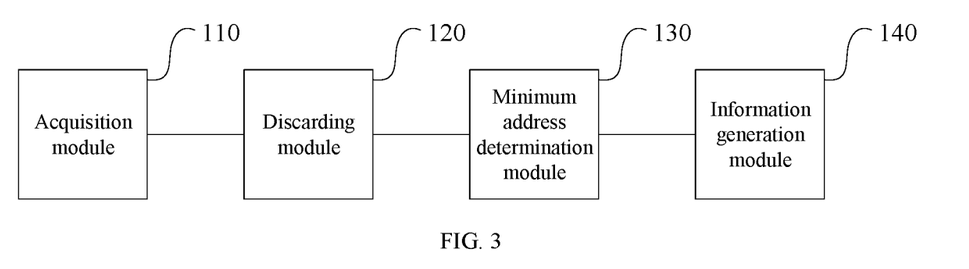
FIG. 3 is a schematic structural diagram of an apparatus for processing an abnormal power failure of a solid state disk provided in one or more embodiments of the present disclosure.

FIG. 3 is a schematic structural diagram of an apparatus for processing an abnormal power failure of a solid state disk provided in an embodiment of the present disclosure. Referring to FIG. 3, the apparatus includes:

an acquisition module 110 configured for acquiring a write operation for the solid state disk in response to detecting an abnormal power failure of the solid state disk;

a discarding module 120 configured for, in response to the write operation being a cold data write operation, acquiring a write address corresponding to the cold write operation and discarding the cold data write operation, where the write address points to a cold data block;

a minimum address determination module 130 configured for obtaining a minimum write address of the cold data block by using the write address; and an information generation module 140 configured for generating data block information about the cold data block by using the minimum write address.

In an embodiment, the minimum address determination module 130 includes:

a comparison unit configured for comparing the write address with the current minimum address of the cold data block;

an updation unit configured for determining the write address as a new current minimum address in response to the write address being less than the current minimum address; and a determination unit configured for determining the current minimum address as the minimum write address in response to determining that there is no pending write operation.

In an embodiment, the apparatus further includes:

a presence determination module configured for determining whether the current minimum address exists; and an initialization module configured for determining the write address as the new current minimum address in response to determining that no current minimum address exists.

Accordingly, the comparison unit is a unit configured for comparing the write address with the current minimum address of the cold data block in response to determining that the current minimum address exists.

In an embodiment, the comparison unit includes:

a data block determination sub-unit configured for determining a cold data block corresponding to the write address by using data block boundary information; and a comparison sub-unit configured for acquiring the current minimum address corresponding to the cold data block, and comparing the current minimum address with the write address.

In an embodiment, the discarding module 120 includes:
a mark acquisition unit configured for acquiring a data type mark in the write operation; and
a type determination unit configured for determining the write operation as the cold data write operation in response to the data type mark indicating a cold data state.

In an embodiment, the discarding module 120 includes:
a resource release unit configured for releasing a write buffer, a context resource and a work flow corresponding to the cold data write operation.

In an embodiment, the acquisition module 110 includes:
a first detection unit configured for, in response to the solid state disk being powered down without receiving a power failure notification sent from a host, determining that an abnormal power failure of the solid state disk is detected.

Alternatively, the acquisition module 110 includes:
a duration counting unit configured for counting a notification duration in response to obtaining a power failure notification; and
a second detection unit configured for determining that an abnormal power failure of the solid state disk is detected in response to the solid state disk being powered down within a notification duration less than a preset duration.

Figure 4:
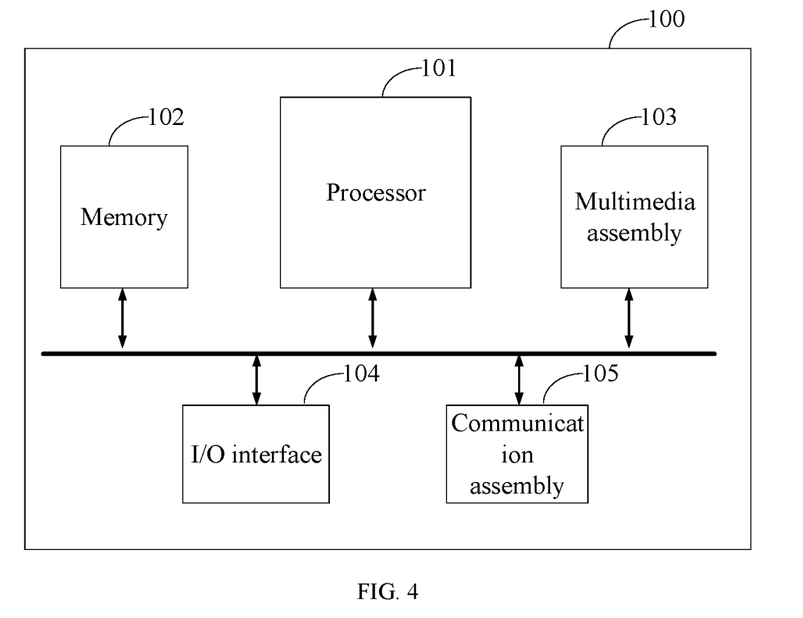
FIG. 4 is a schematic structural diagram of an electronic device provided in one or more embodiments of the present disclosure.

FIG. 4 is a schematic structural diagram of an electronic device provided in an embodiment of the present disclosure. Referring to FIG. 4, the electronic device 100 may include one or more processors 101 and a memory 102, and may further include one or more of a multimedia assembly 103, an information input/information output (I/O) interface 104, and a communication assembly 105.

The (one or more) processors 101 are configured for controlling an overall operation of the electronic device 100 so as to complete all or some of the steps in the above-mentioned method for processing an abnormal power failure of a solid state disk; the memory 102 is configured for storing various types of data to support operations at the electronic device 100, the data may include, for example, instructions for any application or method operating on the electronic device 100, as well as application-related data. The memory 102 may be implemented by any type or combination of volatile or non-transitory memory devices, such as one or more of static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disks.

The multimedia assembly 103 may include a screen and an audio assembly. The screen may be, for example, a touch screen, while the audio assembly is configured to output and/or input audio signals. For example, the audio assembly may include a microphone for receiving external audio signals. The received audio signals may be further stored in the memory 102 or transmitted through the communication assembly 105. The audio assembly also includes at least one speaker for outputting audio signals. The I/O interface 104 provides an interface between (one or more) processors 101 and another interface module, which may be a keyboard, a mouse, a button, etc. This button may be a virtual button or a physical button. The communication assembly 105 is configured for wired or wireless communication between the electronic device 100 and other devices. Wireless communication is, for example, Wi-Fi, Bluetooth, near field communication (NFC), 2G, 3G or 4G, or a combination of one or more of them, and accordingly the communication assembly 105 may include: a Wi-Fi component, a Bluetooth component, an NFC component.

The electronic device 100 may be implemented by one or more application specific integrated circuits (ASIC), digital signal processors (DSP), digital signal processing devices (DSPD), programmable logic devices (PLD), field programmable gate arrays (FPGA), controllers, micro-controllers, microprocessors, or other electronic elements for performing the method for processing an abnormal power failure of a solid state disk given in the above-mentioned embodiments.

The non-transitory computer-readable storage medium provided by an embodiment of the present disclosure is described below, and reference can be made to the non-transitory computer-readable storage medium described below and method for processing an abnormal power failure of a solid state disk described above correspondingly.

The present disclosure also provides a non-transitory computer-readable storage medium having stored thereon computer-readable instructions that, when executed by the (one or more) processors, implement the steps of the above-mentioned method for processing an abnormal power failure of a solid state disk.

The non-transitory computer readable storage medium may include various media that may store computer readable instructions, such as a U-disk, a removable hard disk, a read-only memory (ROM), a random access memory (RAM), magnetic or optical disk.

Embodiments in the specification are described in a progressive way. Each embodiment focuses on the differences with other embodiments. The same and similar parts of various embodiments may be referred to each other. For the apparatus provided by the embodiment, because it corresponds to the method provided by the embodiment, the description is relatively simple. It may be referred to the description in the method section for relevant points.

It may be further realized by those skilled in the art that units and algorithm steps of examples described in combination with embodiments disclosed herein may be realized in electronic hardware, computer software or a combination of the both. In order to clearly illustrate interchangeability of hardware and software, components and steps of examples have been generally described by functions in the above description. Whether these functions are implemented in hardware or software depends on specific application and design constraints of technical solutions. Described functions may be implemented for each specific application using different methods by those skilled in the art, but such implementation should not be considered beyond the scope of the present disclosure.

The steps of the methods or algorithms described in connection with the embodiments disclosed herein may be directly implemented by hardware, software modules executed by a processor, or a combination of both. Software modules can be placed in random access memory (RAM), internal memory, read-only memory (ROM), electrically programmable ROM, electrically erasable programmable ROM, registers, hard disk, removable disk, CD-ROM, or any other storage medium known in the technical field.

Finally, it should be stated, relational terms such as "first" and "second" are used merely to distinguish an entity or operation from another entity or operation, and do not necessarily require or imply the existence of any such actual relationship or sequence between these entities or operations. Furthermore, the terms "comprising", "including" or any other variation thereof are intended to cover a nonexclusive inclusion, such that a process, method, article, or device including a list of elements includes not only those elements but also other elements not expressly listed, or elements inherent to the process, method, article or device.

Herein, specific examples are used to illustrate the principles and implementation methods of the present application. The descriptions of the above embodiments are only used to help understand the method and core idea of the application; meanwhile, for those skilled in the art, there will be changes in the specific implementation and scope of application based on the core idea of the application. In summary, the content of the specification should not be construed as limiting the present disclosure.

The invention claimed is:

1. A method for processing an abnormal power failure of a solid state disk, comprising:
   acquiring a write operation for the solid state disk in response to detecting the abnormal power failure of the solid state disk;
   in response to the write operation being a cold data write operation, acquiring a write address corresponding to the cold data write operation, and discarding the cold data write operation, wherein the write address points to a cold data block; wherein the cold data write operation is for writing cold data, the cold data is data that has been stored in the solid state disk, and the write operation corresponding to the cold data is used for migrating the cold data from one storage location to another storage location;
   obtaining a minimum write address of the cold data block by using the write address; and
   generating data block information corresponding to the cold data block by using the minimum write address.

2. The method for processing the abnormal power failure of the solid state disk according to claim 1, wherein the obtaining the minimum write address of the cold data block by using the write address comprises:
   comparing the write address with a current minimum address of the cold data block;
   determining the write address as a new current minimum address in response to the write address being less than the current minimum address;
   determining the current minimum address as the minimum write address in response to an absence of a pending write operation.

3. The method for processing the abnormal power failure of the solid state disk according to claim 2, wherein before comparing the write address with the current minimum address of the cold data block, the method further comprises:
   deciding whether the current minimum address exists;
   in response to deciding that no current minimum address exists, determining the write address as the new current minimum address;
   in response to deciding that the current minimum address exists, determining to perform the comparing the write address with the current minimum address of the cold data block.

4. The method for processing the abnormal power failure of the solid state disk according to claim 2, wherein the comparing the write address with the current minimum address of the cold data block comprises:
   determining that the cold data block corresponds to the write address by using data block boundary information; and
   acquiring the current minimum address of the cold data block, and comparing the current minimum address with the write address.

5. The method for processing the abnormal power failure of the solid state disk according to claim 2, further comprising:
   in response to the current minimum address being present, performing a comparison with remaining write addresses;
   in response to the current minimum address being absent, creating the current minimum address, and determining the write address as the current minimum address.

6. The method for processing the abnormal power failure of the solid state disk according to claim 1, wherein, in response to the write operation being the cold data write operation, the method further comprises:
   acquiring a data type mark in the write operation; and
   determining that the write operation is the cold data write operation in response to the data type mark indicating a cold data state.

7. The method for processing the abnormal power failure of the solid state disk according to claim 1, wherein the discarding the cold data write operation comprises:
   releasing a write buffer, a context resource and a work flow corresponding to the cold data write operation.

8. The method for processing the abnormal power failure of the solid state disk according to claim 1, wherein the detecting the abnormal power failure of the solid state disk comprises:
   in response to the solid state disk being powered down without receiving a power failure notification sent from a host, determining that the abnormal power failure of the solid state disk is detected.

9. The method for processing the abnormal power failure of the solid state disk according to claim 1, wherein the detecting the abnormal power failure of the solid state disk comprises:
   counting a notification duration in response to receiving a power failure notification sent from a host of the solid state disk; and
   detecting the abnormal power failure of the solid state disk in response to the solid state disk being powered down when the counted notification duration is less than a preset duration.

10. The method for processing the abnormal power failure of the solid state disk according to claim 1, wherein the method is performed by a controller in the solid state disk.

11. The method for processing the abnormal power failure of the solid state disk according to claim 1, further comprising:
    detecting a data source of the write operation; and
    in response to the data source of the write operation being the solid state disk, determining the write operation as the cold data write operation.

12. The method for processing the abnormal power failure of the solid state disk according to claim 11, wherein the cold data write operation includes an encapsulation process, comprising:
    allocating a context resource to the cold data;
    allocating the write address to the cold data;
    allocating an available write buffer; and
    allocating an available work flow identification.

13. The method for processing the abnormal power failure of the solid state disk according to claim 12, wherein the allocating the available write buffer comprises: in response to a shortage of available write buffer space, waiting for write buffer space occupied by other write operations to be released before allocating the available write buffer space; and the allocating the available work flow identification comprises: in response to an absence of the available work flow identification, waiting for a work flow identification occupied by other write operations to be released before allocating the available work flow identification.

14. The method for processing the abnormal power failure of the solid state disk according to claim 1, wherein the abnormal power failure does not include a normal power failure, wherein the normal power failure comprises the solid state disk powering down after a controller in the solid state disk receives a power failure notification issued by a host and completes all operations.

15. The method for processing the abnormal power failure of the solid state disk according to claim 1, wherein the solid state disk includes a plurality of cold data blocks, and the method further comprises:
  in response to the write address being less than a current minimum address, determining the write address as a new current minimum address, wherein;
  the current minimum address is the minimum write address in all discarded cold data write operations corresponding to the plurality of cold data blocks; and
  determining the current minimum address as the minimum write address of the cold data block.

16. The method for processing the abnormal power failure of the solid state disk according to claim 1, further comprising: in response to determining that the solid state disk starts to operate again, resetting a position of a pointer by using the data block information, so that the pointer points to an earliest blank position in the cold data block.

17. The method for processing the abnormal power failure of the solid state disk according to claim 1, wherein the cold data block refers to a data block dedicated to storing the cold data.

18. An electronic device, comprising:
  one or more memories configured for storing computer readable instructions; and
  one or more processors configured for executing the computer readable instructions to implement operations of:
    acquiring a write operation for a solid state disk in response to detecting an abnormal power failure of the solid state disk;
    in response to the write operation being a cold data write operation, acquiring a write address corresponding to the cold data write operation, and discarding the cold data write operation, wherein the write address points to a cold data block; wherein the cold data write operation is for writing cold data, the cold data is data that has been stored in the solid state disk, and the write operation corresponding to the cold data is used for migrating the cold data from one storage location to another storage location;
    obtaining a minimum write address of the cold data block by using the write address; and
    generating data block information corresponding to the cold data block by using the minimum write address.

19. A non-transitory computer readable storage media storing computer readable instructions that, when executed by one or more processors, cause the one or more processors to perform operations of:
  acquiring a write operation for a solid state disk in response to detecting an abnormal power failure of the solid state disk;
  in response to the write operation being a cold data write operation, acquiring a write address corresponding to the cold data write operation, and discarding the cold data write operation, wherein the write address points to a cold data block; wherein the cold data write operation is for writing cold data, the cold data is data that has been stored in the solid state disk, and the write operation corresponding to the cold data is used for migrating the cold data from one storage location to another storage location;
  obtaining a minimum write address of the cold data block by using the write address; and
  generating data block information corresponding to the cold data block by using the minimum write address.

* * * * *